United States Patent [19]

Sloboda et al.

[11] 3,862,838

[45] Jan. 28, 1975

[54] BRAZING ALLOYS

[75] Inventors: Meczyslaw Herman Sloboda; John Sidney Hatswell, both of London, England

[73] Assignee: Johnson Matthey & Co., Limited, London, England

[22] Filed: June 5, 1973

[21] Appl. No.: 367,226

[30] Foreign Application Priority Data
June 7, 1972 Great Britain..................... 26551/72

[52] U.S. Cl. ............................. 75/134 C, 75/173 C
[51] Int. Cl. ............................................... C22c 5/00
[58] Field of Search ...................... 75/173 C, 134 C

[56] References Cited
UNITED STATES PATENTS

| | | | |
|---|---|---|---|
| 2,019,984 | 11/1935 | Leach | 75/173 C |
| 2,189,640 | 2/1940 | Powell | 75/173 C |
| 2,192,455 | 3/1940 | Streicher | 75/173 C |
| 2,192,456 | 3/1940 | Streicher | 75/173 C |
| 2,252,443 | 8/1941 | Shipley | 75/173 C |

*Primary Examiner*—L. Dewayne Rutledge
*Assistant Examiner*—E. L. Weise
*Attorney, Agent, or Firm*—Cushman, Darby & Cushman

[57] ABSTRACT

This invention relates to a silver based brazing alloy containing, apart from impurities, 40–50 percent by weight of silver, 20–33 percent by weight zinc, 12–40 percent by weight copper and optionally 0–5 percent by weight of tin. Brazing alloys which we have found particularly satisfactory are those containing A. 45 percent by weight silver, 25 percent by weight copper and 30 percent by weight zinc.

B. 40 percent by weight silver, 30 percent by weight copper and 30 percent by weight zinc.

C. 40 percent by weight silver, 30 percent by weight copper, 28 percent by weight zinc and 2 percent by weight tin, and D. 40 percent by weight silver, 27 percent by weight copper and 33 percent by weight zinc.

5 Claims, No Drawings

BRAZING ALLOYS

This invention relates to a silver based brazing alloy.

One important property of a brazing alloy is its melting point. Generally speaking, overall brazing costs decrease proportionately with any reduction in the melting point of the brazing alloy used. Further, the lower the melting point of the brazing alloy the lesser the extent to which the mechanical properties of the metals to be joined are affected. Silver based brazing alloys containing copper, zinc and cadmium commonly have melting ranges below 650°C. It is for this reason that silver-copper-zinc-cadmium brazing alloys with melting points down to 600°C are widely used in industry.

However, if such alloys are incorrectly used they are liable to produce a toxic hazard owing to the presence of cadmium.

According to this invention a silver based alloy contains (apart from impurities) 40 to 50 percent by weight silver, 20 to 33 percent by weight zinc, 12 to 40 percent by weight copper and optionally 0 to 5 percent by weight tin.

Many of the silver based brazing alloys according to this invention possess the following properties:

TABLE 1

| Alloy Composition wt % | | | | Melting Range °C |
|---|---|---|---|---|
| Silver Ag | Copper Cu | Zinc Zn | Tin Sn | |
| 45 | 25 | 30 | 0 | 670 – 700 |
| 40 | 30 | 30 | 0 | 660 – 720 |
| 40 | 30 | 28 | 2 | 640 – 700 |
| 40 | 27 | 33 | 0 | 680 – 720 |

The alloys listed in Table 1 exhibit cold work ability and may be fabricated in the wrought form. This is particularly convenient for the brazing techniques which are at present commonly used in industry.

Experimental data reproduced in Tables 2 and 3 show that the mechanical properties of joints made in mild steel and 60/40 brass respectively compare favourably with those of similar joints made with one of the most widely used standard Ag-Cu-Zn-Cd alloys. They show also that a small departure from the range of compositions which come within the scope of the present invention produces a catastrophic decrease in the joint tensile strength and ability to carry impact loads.

TABLE 2

Comparative data on certain mechanical properties of joints made in mild steel with the new brazing alloys, with a standard Ag-Cu-Zn-Cd alloy, and with an experimental Ag-Cu-Zn alloy which - although of a similar composition to that of the alloys claimed - is outside the scope of the present invention

| Brazing Alloy | Joint Tensile Strength tons/sq.inch | Joint Shear Strength tons/sq.inch | Joint Resistance to Impact Bending | |
|---|---|---|---|---|
| | | | Energy absorbed by the specimen, ft. lb. | Location of Fracture |
| 45Ag–25Cu–30Zn | 27.0 | 11.4 | 5.2 | No Fracture |
| 40Ag–30Cu–30Zn | 29.4 | 11.3 | 5.0 | do. |
| 40Ag–30Cu–28Zn–2Sn | 25.8 | 9.5 | 5.4 | do. |
| 40Ag–27Cu–33Zn | 32.9 | 10.3 | 5.0 | do. |
| 50Ag–15.5Cu–19Cd–15.5Zn | 23.1 | 11.9 | 5.0 | No fracture |
| 40Ag–24Cu–36Zn | Specimens fractured during machining | 8.7 | 2.8 | Specimens fractured at the joint interface |

Table 3

Comparative data on certain mechanical properties of joints made in 60/40 brass with the new brazing alloys with a standard Ag-Cu-Zn-Cd alloy

| Brazing Alloy | Joint Tensile Strength tons/sq.inch | Joint Shear Strength tons/sq.inch | Joint Resistance to Impact Bending | |
|---|---|---|---|---|
| | | | Energy absorbed by the specimen ft.lb. | Location of Fracture |
| 45Ag–25Cu–30Zn | 15.0 | 8.0 | 3.2 | No fracture |
| 40Ag–30Cu–30Zn | 12.0 | 9.0 | 3.1 | do. |
| 40Ag–30Cu–28Zn–2Sn | 19.5 | 5.5 | 3.5 | do. |
| 40Ag–27Cu–33Zn | 16.0 | 8.4 | 3.2 | do. |
| 50Ag–15.5Cu–10Cd–15.5Zn | 13.0 | 7.1 | 3.2 | do. | i. melting points not exceeding 720°C;
ii. ability to be produced in wrought forms (wire, strip, foil);
iii. ability to produce strong and ductile joints with both ferrous and non-ferrous metals.

In addition the silver based brazing alloys according to this invention are non-toxic.

The melting ranges of four alloys according to the present invention which have been found to be particularly useful are given in Table 1.

One particular range of alloys falling within the scope of this invention are those containing, apart from impurities, 40–43% by weight silver, 20–33% by weight zinc and 12–40% by weight copper. Another range of alloys are those containing 45–50% by weight silver, 20–33% by weight zinc and 12–40% by weight copper.

What we claim is:

1. A silver based alloy consisting essentially of, apart from impurities, 40–45 percent by weight silver, 25–30 percent by weight copper, 28–33 percent by weight zinc and 0–5 percent by weight tin.

2. An alloy consisting essentially of, apart from impurities, 45 percent by weight silver, 25 percent by weight copper and 30 percent by weight zinc.

3. An alloy consisting essentially of, apart from impurities, 40 percent by weight silver, 30 percent by weight copper and 30 percent by weight zinc.

4. An alloy consisting essentially of, apart from impurities, 40 percent by weight silver, 30 percent by weight copper, 28 percent by weight zinc and 2 percent by weight tin.

5. An alloy consisting essentially of, apart from impurities, 40 percent by weight silver, 27 percent by weight copper and 33 percent by weight zinc.

* * * * *